United States Patent Office 3,281,467
Patented Oct. 25, 1966

3,281,467
HERBICIDAL ANILIDES
Harold F. Wilson, Moorestown, N.J., and Dougal Harold McRae, Hatboro, Pa., assignors to Rohm & Haas Company, Philadelphia, Pa., a corporation of Delaware
No Drawing. Filed Jan. 20, 1964, Ser. No. 338,596
7 Claims. (Cl. 260—562)

This invention is concerned with anilides derived from 3-chloro-4-(mono- or dialkylamino)anilines and from 3,5-dichloro-4-(mono- or dialkylamino)anilines and salts derived therefrom. This invention also deals with herbicidal compositions containing these anilides and with methods for controlling undesirable plant growth with them.

Within recent times, the use of chemical plant growth regulators and herbicides has become increasingly important for industry and agriculture. This is especially true in the growing of economic crops. Since there are so many different kinds of weeds and so many crops for which weed control is needed, myriads of weed problems exist. There is a continuing need for the discovery of chemical compounds for solving these weed problems. For agricultural use, it is important that the herbicide be effective at economically low rates of application, that under the conditions of use, it will do not permanent damage to the crop involved, and that no permanent or prolonged poisoning of the soil occurs. It is often desirable that herbicidal agents exhibit specific action against individual types of weeds or tolerance to specific crop plants. Some compounds are highly toxic to all types of plants and thus cannot be used on agronomic crops where selective phytotoxic action is required. These special properties are not predictable and can be found only by research and experimentation. The compounds of the present invention provide a significant advance in the science of weed control.

The anilides of this invention may be represented by the formula

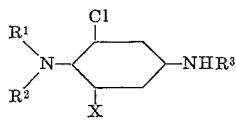

wherein $R^1$ and $R^2$ are hydrogen and lower alkyl groups of 1 to 4 carbon atoms with the proviso that at least one of the R's be alkyl, X is hydrogen and chlorine and $R^3$ is an acyl group derived from propionic acid, isobutyric acid, α-methylvaleric acid, or methacrylic acid.

There are relatively few anilides known, from the literature, to have herbicidal properties. German Patents Nos. 1,005,784 and 1,039,779 disclose such anilides in which the nuclear substituents may be alkyl, halogen or nitro. British Patent No. 869,169 discloses herbicidal anilides derived from α-methyl fatty acids in which the nuclear substituents are chlorine or methyl. It is significant that the Chemical Biological Coordination Center in a vast screening of compounds for effects on plant growth and behavior found that, of the propionanilides, only those having a nuclear halogen, methyl or nitro group were active (see "Plant Regulators," CBCC Positive Data Series No. 2, 1955, National Research Council, pages 39–40).

The p-mono- or dialkylamino substituted anilides of this invention are not known in the literature and are, therefore, novel compounds.

3'-chloro-4'-(dimethylamino)acetanilide and 3',5' - dichloro-4'-(dimethylamino)acetonitrile are reported in the Journal of the Chemical Society, 1942, page 755. There is no reporting of their possessing any biological activity, and we have found that they are useless as herbicides. We have also studied related anilides having an unsubstituted amino group or those with a cycloalkylamino substituent, such as 4'-amino-3',5'-dichloropropionanilide and 3'-chloro-4'-(cyclohexylamino)propionanilide, and have found that they are very low in phytotoxic responses. Likewise, 3' - chloro-4'-pyrrolidinopropionanilide and 3'-chloro-4'-pyrrolidinomethacrylanilide were found to be essentially devoid of herbicidal activity. The property of controlling plant growth is not inherent in nuclear amino-substituted anilides.

The herbicidal anilides of this invention are distinguished in part over the known herbicidal anilides by the presence of the alkylamino substituent. This grouping renders these compounds more soluble in polar solvents, which is particularly true of the salts derived from them, and thus affects their mode of action and selectively as herbicides. This amino grouping also influences the translocatability and biodegradability of these herbicides. In the form of salts, they are rendered cationic, become substantive to negatively charged foliage, and thus have increased persistence.

There are exacting requirements of structure for this class of anilides in order to produce practical selective herbicides. The amino grouping must be in the para-position to the acylamido grouping. The mono- or dialkyl substituents on the amino grouping must contain no more than 4 carbon atoms for any one radical. The anilides must have 1 or 2 chloro atoms in the ortho-position of the amino grouping.

The preferred anilides of this invention are those which have a dimethylamino substituent. The monochloro derivatives are preferred over the dichloro ones. In a given series of these anilides wherein the only variable is the acyl radical, different types of crop tolerances and weed susceptibilities are exhibited depending on the acid used. In general, the most herbicidal of the anilides of this invention are produced from α-methylvaleric acid, followed in decreasing order of activity by those derived from methacrylic acid, isobutyric acid and propionic acid.

Illustrative of the compounds of this invention are the following:

3'-chloro-4'-(methylamino)propionanilide
3',5'-dichloro-4'-methylamino-2-methylvaleranilide
3'-chloro-4'-(dimethylamino)propionanilide
3'-chloro-4'-(dimethylamino)isobutyranilide
3'-chloro-4'-(dimethylamino)methacrylanilide
3'-chloro-4'-dimethylamino-2-methylvaleranilide
3',5'-dichloro-4'-(dimethylamino)propionanilide
3',5'-dichloro-4'-(dimethylamino)isobutyranilide
3',5'-dichloro-4'-(dimethylamino)methacrylanilide
3',5'-dichloro-4'-dimethylamino-2-methylvaleranilide
3'-chloro-4'-(ethylamino)propionanilide
3'-chloro-4'-diethylamino-2-methylvaleranilide 3'-chloro-4'-(isopropylamino)propionanilide
3',5'-dichloro-4'-(isopropylamino)isobutyranilide
3'-chloro-4'-diisopropylamino-2-methylvaleranilide
3'-chloro-4'-(t-butylamino)propionanilide
3',5'-dichloro-4'-(t-butylamino)isobutyranilide
3'-chloro-4'-(t-butylamino)methacrylanilide
3'-chloro-4'-dibutylamino-2-methylvaleranilide Various salts of the amino-substituted anilides of this invention may be prepared, for example, by neutralization of the free base with an acid. Typical of these salts are the hydrohalides, sulfates, nitrates, phosphates, fluoborates, acetates, acid oxalates, and acid maleates. These salts are herbicidal and, in general, follow the pattern of weedicidal activity and crop tolerance exhibited by the parent amine. Usually, a salt made from a strong acid, such as a mineral acid, like hydrochloric acid, has somewhat reduced activity over that of the parent amine, whereas a salt made from a weak acid, such as acetic acid, often has the herbicidal effectiveness of the free base itself. One advantage of the salt form of the amino-substituted anilides is that they are more soluble in polar solvents, particularly water, and as a consequence, are more useful in formulations made using such solvents as a carrier.

The anilides may be prepared by the reaction of 3-chloro-4-(mono- or dialkylamino)aniline or 3,5-dichloro-4-(mono- or dialkylamino)aniline with propionic acid, isobutyric acid, methacrylic acid or α-methylvaleric acid or their acid halides or their acid anhydrides. While this is usually accomplished in the presence of a volatile, inert, organic solvent, the reaction may also be carried out in the absence of a solvent. If the acid halide is used, there is usually employed an acid acceptor, such as tertiary amines, to neutralize the hydrogen halide formed. If the acid itself is used, the reaction is promoted by heating under reflux and removal of water, as by an azeotroping liquid.

The acylation of a 3-chloro-4-(monoalkylamino)aniline or of a 3,5-dichloro-4-(monoalkylamino)aniline wherein the alkyl group is other than t-alkyl presents a special situation since bis-acylation can occur, i.e., acylation of both the primary and secondary amino groups. In this case, a mixture of the desired chlorinated 4-(alkylamino anilide and the chlorinated 4-(acylalkylamino) anilide is produced. The two products are, however, readily separated.

The 3-chloro-4-(mono- or dialkylamino)anilines used for these preparations may be made by methods known in the art. One convenient method is to react 3,4-dichloronitrobenzene with mono- or dialkylamines to give 3-chloro-4-(mono- or dialkylamino)nitrobenzenes. The resulting nitrobenzenes are then reduced to the corresponding 3-chloro-4-(mono- or dialkylamino)anilines.

For the preparation of the 3,5-dichloro-4-(mono- or dialkylamino)anilines, a useful method is to chlorinate 3-chloro-4-(mono- or dialkylamino)nitrobenzenes to give 3,5-dichloro-4-(mono- or dialkylamino)nitrobenzenes, which are then subsequently reduced to the corresponding anilines.

The following describes the preparation of intermediates and of typical anilides of this invention.

Preparation of:

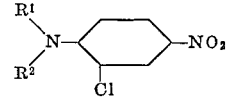

GENERAL METHOD A 3,4-dichloronitrobenzene (1 mole) and the amine, $R^1R^2NH$ (3 moles), are placed in a Parr bomb and heated to 150° to 210° C. for 10 to 16 hours. After cooling, the bomb is opened and the contents extracted with benzene. The benzene extract is dried, filtered and evaporated to dryness. The residue, if solid, is recrystallized, otherwise is distilled under reduced pressure. Hydrocarbons usually provide satisfactory recrystallization solvents.

GENERAL METHOD B 3,4-dichloronitrobenzene (1 mole) is mixed with the amine, $R^1R^2NH$ (4.3 moles), either as an aqueous solution or the anhydrous amine and sufficient methanol added to give a homogeneous solution. The mixture is refluxed for 10 to 14 hours, then poured into water. If the product separates as a solid, it is filtered and recrystallized; if it separates as an oil, it is extracted and subsequently distilled.

Table I gives the properties of typical preparations:

TABLE I

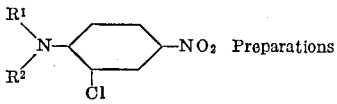 Preparations

| Compound Prepared | Method Used | M.P. (° C.) | B.P. (° C.)/mm. Hg | Analysis (Percent) | | | Yield (Percent) |
|---|---|---|---|---|---|---|---|
| | | | | Element | Theory | Found | |
| 3-Cl-4-$CH_3NHC_6H_3NO_2$ | A | a 110-112 | | | | | 75 |
| 3-Cl-4-$C_2H_5NHC_6H_3NO_2$ | B | 59.5-60.5 | | Cl | 17.67 | 17.52 | 71 |
| | | | | N | 13.97 | 13.80 | |
| 3-Cl-4-$C_3H_7NHC_6H_3NO_2$ | B | 43-45 | 150-155/.56 | Cl | 16.52 | 16.78 | 74 |
| | | | | N | 13.05 | 12.95 | |
| 3-Cl-4-iso-$C_3H_7NHC_6H_3NO_2$ | B | | 154-159/.55 | Cl | 16.52 | 16.54 | 34 |
| | | | | N | 13.05 | 13.09 | |
| 3-Cl-4-t-$C_4H_9NHC_6H_3NO_2$ | A | 98-100 | | C | 52.52 | 52.25 | 93 |
| | | | | H | 5.73 | 5.92 | |
| 3-Cl-4-$(CH_3)_2NC_6H_3NO_2$ | B | b 75.5-77 | | Cl | 15.50 | 15.48 | |
| 3-Cl-4-$(C_3H_7)_2NC_6H_3NO_2$ | A | | 137-141/.85 | C | 56.13 | 56.18 | 59 |
| | | | | H | 6.63 | 6.79 | |
| | | | | Cl | 13.90 | 14.02 | | a See Stoermer and Hoffman, Ber. dtsch. chem. Ges. 31, 2523 (1898)—M.P.=116°-117° C.
b See Reiding, Rec. trav. chim. 23, 365 (1904)—M.P.=78° C.

Preparation of:

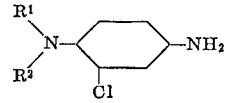

GENERAL METHOD C

Granulated tin (1.5 to 2.5 atoms) is placed in a flask with 3-Cl-4-R¹R²NC₆H₃NO₂ compound (1 mole). There is added concentrated hydrochloric acid (5 to 10 moles) and the mixture heated on a steam bath 0.5 to 2 hours. The mixture is then made alkaline with concentrated ammonium hydroxide. The mixture is filtered and both the filtrate and filter cake are extracted with chloroform or methylene dichloride. The extracts are combined, dried and evaporated. The residue is either recrystallized or distilled. Hexane is a preferred solvent for recrystallization.

Table II gives the properties of typical preparations:

TABLE II

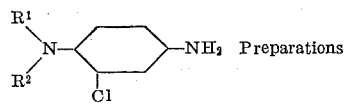 Preparations

| Compound Prepared | M.P. (° C.) | B.P. (°C.)/ mm. Hg. | Analysis (percent) Element | Theory | Found | Yield (percent) |
|---|---|---|---|---|---|---|
| 3-Cl-4-CH₃NHC₆H₃NH₂ | | 118–123/.8 | Cl | 22.73 | 22.54 | 61 |
| | | | N | 17.95 | 17.72 | |
| 3-Cl-4-C₂H₅NHC₆H₃NH₂ | | 130/.9 | Cl | 20.78 | 19.88 | 64 |
| | | | N | 16.42 | 15.89 | |
| 3-Cl-4-C₃H₇NHC₆H₃NH₂ | | 124–126/.5 | Cl | 19.20 | 16.60 | 99.5 |
| | | | N | 15.17 | 13.27 | |
| 3-Cl-4-iso-C₃H₇NHC₆H₃NH₂ | | 114–115/.58 | Cl | 19.20 | 18.16 | 95.7 |
| | | | N | 15.17 | 14.52 | |
| 3-Cl-4-t-C₄H₉NHC₆H₃NH₂ | 64–64.5 | | Cl | 17.84 | 18.30 | 65.7 |
| | | | N | 14.04 | 13.90 | |
| 3-Cl-4-(CH₃)₂NC₆H₃NH₂ | ᵃ 62–63 | | Cl | 20.85 | 20.85 | 50 |
| | | | N | 16.42 | 16.24 | |
| 3-Cl-4-(C₃H₇)₂NC₆H₃NH₂ | | 143/1.25 | Cl | 15.64 | 15.44 | 98 |
| | | | N | 12.36 | 12.05 | |

ᵃ See Ayling, Gorvin & Hinkel, J. Chem. Soc. 1942, 755—M.P.=61.5°–63° C.

Preparation of:

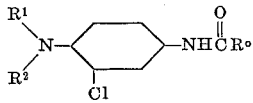

GENERAL METHOD D

A mixture of the 3-Cl-4-R¹R²NC₆H₃NH₂ compound (1 mole) and triethylamine (1 mole) is dissolved in benzene (2 to 5 parts by weight per part of

compound) and there is slowly added the acid chloride RᵒCOCl (1 to 1.3 moles). After stirring at temperatures which can be varied from 10° to 50° C. (room temperature preferred) for 0.5 to 2 hours, the product is washed with water and the benzene layer evaporated. If the residue is a solid, it is recrystallized.

All final products were found to be homogeneous by gas-liquid chromatography. The infrared spectra showed the expected features, notably the carbonyl band at 6.1 microns for all products.

The anhydrides of the acids, (RᵒCO)₂O, may be substituted for the acid chloride in the above general method of preparation. In this procedure, the triethylamine condensing agent is omitted. An acid catalyst, such as sulfuric acid, is often desirable.

The anilides may be prepared by reaction of the anilines with the appropriate carboxylic acid. In this procedure, a volatile, inert, organic solvent, which includes an excess of the organic acid itself, is usually used. The mixture is heated under reflux temperatures, which may vary from 50° to 150° C., with removal of water as by an azeotroping liquid.

The following gives details of a typical preparation. Parts are by weight.

*Example 1.—Preparation of 3′-chloro-4′ (dimethylamino) propionanilide*

(a) *Preparation of 3-chloro-4-(dimethylamino)nitrobenzene.*—To a mixture of 10 parts (0.052 mole) of 3,4-dichloronitrobenzene and 30 parts (0.225 mole) of 40% aqueous dimethylamine was added sufficient methanol to give a homogeneous solution. This was refluxed 14 hours, then poured into water to give a solid. The solid was filtered and recrystallized from hexane to give 10.2 parts of product melting at 75.5° to 77° C. It is a 98% yield of 3-chloro-4-(dimethylamino)nitrobenzene.

(b) *Preparation of 3-chloro-4-(dimethylamino)aniline.*—A mixture of 3.1 parts (0.015 mole) of 3-chloro-4-(dimethylamino)nitrobenzene, 4 parts (0.034 atom) of granulated tin and 15 parts (0.13 mole) of concentrated hydrochloric acid was heated on a steam bath for 1 hour. The mixture was then made alkaline with concentrated ammonium hydroxide and filtered. Both the filtrate and filter cake were extracted with chloroform. The chloroform extracts were combined, dried and evaporated to give a product which was recrystallized from hevane to give 1.3 parts of a solid melting at 62° to 63° C. This is a 50% yield of 3-chloro-4-(dimethylamino)aniline.

(c) *Preparation of 3′-chloro-4′-(dimethylamino)propionanilide.*—To a solution of 5 parts (0.03 mole) of 3-chloro-4-(dimethylamino)aniline and 3 parts (0.03 mole) of triethylamine in 17.5 parts of benzene was added 2.8 parts (0.03 mole) of propionyl chloride dropwise. The reaction mixture was stirred 1 hour and then was diluted with water. The benzene layer was washed with 5% aqueous sodium hydroxide and with water, then evaporated. The remaining residue was recrystallized from hexane to give 6.3 parts of solid melting at 89° to 90° C. This was found by analysis to contain 58.4% C, 7.7% H, 12.2% N and 15.8% Cl; calculated for C₁₁H₁₅ClN₂O are 58.3% C, 6.7% H, 12.4% N and 15.6% Cl. It is a 95% yield of 3′-chloro-4′-(dimethylamino)propionanilide.

In a manner as described for Example 1, the following compounds having the characteristics indicated in Tables III, IV, V, and VI were prepared.

TABLE III

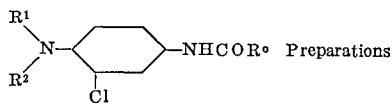

$R^1R^2N$—[ring with Cl]—NHCOR° Preparations

| Example | R¹ | R² | R° | M.P. (°C.) | Recrystallization Solvent | Yield (percent) |
|---|---|---|---|---|---|---|
| 2 | CH₃ | H | C₃H₇(CH₃)CH— | 83-85 | | 27 |
| 3 | C₂H₅ | H | C₃H₇(CH₃)CH— | 61-65 | Aqueous methanol | 28 |
| 4 | n-C₃H₇ | H | CH₃CH₂— | 72-73 | Cyclohexane | 27 |
| 5 | n-C₃H₇ | H | CH₂=C(CH₃)— | 87.5-88.5 | Hexane-toluene | 21 |
| 6 | iso-C₃H₇ | H | CH₃CH₂— | 78-83 | Hexane | 92 |
| 7 | iso-C₃H₇ | H | (CH₃)₂CH— | 105-107 | Cyclohexane | 39 |
| 8 | iso-C₃H₇ | H | C₃H₇(CH₃)CH— | 86-87 | Hexane | 66 |
| 9 | iso-C₃H₇ | H | CH₂=C(CH₃)— | 86-88 | Cyclohexane | 52 |
| 10 | t-C₄H₉ | H | CH₃CH₂— | 93-95 | Hexane | 61 |
| 11 | t-C₄H₉ | H | C₃H₇(CH₃)CH— | 86.5-88.5 | do | 46 |
| 12 | CH₃ | CH₃ | (CH₃)₂CH— | 84-85 | do | 73 |
| 13 | CH₃ | CH₃ | C₃H₇(CH₃)CH— | 80-82 | | 23 |
| 14 | CH₃ | CH₃ | CH₂=C(CH₃)— | 115-116 | Toluene | 58 |
| 15 | C₃H₇ | C₃H₇ | CH₃CH₂ | Oil | | 74 |
| 16 | C₃H₇ | C₃H₇ | C₃H₇(CH₃)CH— | 53.5-55.5 | | 90 |

TABLE IV

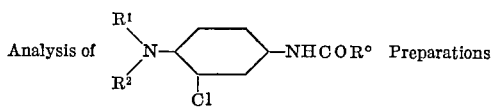

Analysis of $R^1R^2N$—[ring with Cl]—NHCOR° Preparations

| Example | Empirical Formula | ANALYSIS | | | |
|---|---|---|---|---|---|
| | | Percent Cl | | Percent N | |
| | | Theory | Found | Theory | Found |
| 2 | C₁₃H₁₉ClN₂O | 13.9 | 14.0 | 11.0 | 10.9 |
| 3 | C₁₄H₂₁ClN₂O | 13.2 | 13.2 | 10.4 | 10.5 |
| 4 | C₁₂H₁₇ClN₂O | 14.7 | 14.7 | 11.6 | 11.6 |
| 5 | C₁₃H₁₇ClN₂O | 14.0 | 13.9 | 11.1 | 11.0 |
| 6 | C₁₂H₁₇ClN₂O | 14.7 | 14.7 | 11.6 | 11.4 |
| 7 | C₁₃H₁₉ClN₂O | 13.9 | 13.7 | 11.0 | 10.7 |
| 8 | C₁₅H₂₃ClN₂O | 12.5 | 12.5 | 9.9 | 9.7 |
| 9 | C₁₃H₁₇ClN₂O | 14.0 | 14.4 | 11.1 | 11.0 |
| 10 | C₁₃H₁₉ClN₂O | 13.9 | 14.2 | 11.0 | 10.8 |
| 11 | C₁₆H₂₅ClN₂O | 12.0 | 12.1 | 9.5 | 9.4 |
| 12 | C₁₂H₁₇ClN₂O | 14.7 | 15.0 | 11.6 | 11.6 |
| 13 | C₁₄H₂₁ClN₂O | 13.2 | 13.3 | 10.4 | 10.4 |
| 14 | C₁₂H₁₅ClN₂O | 14.9 | 15.0 | 11.7 | 11.7 |
| 15 | C₁₅H₂₃ClN₂O | 12.5 | 12.7 | 9.9 | 9.6 |
| 16 | C₁₈H₂₉ClN₂O | 10.9 | 10.8 | 8.6 | 8.5 |

One convenient method for preparing

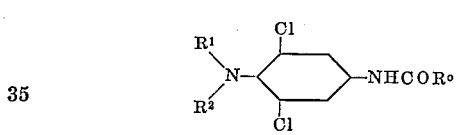

structures is to chlorinate the corresponding 2-chloro-4-nitroanilines (see Table I), then reduce (as by Method C) the resulting 3,5-dichloro-4-(R¹R²N)nitrobenzenes to the corresponding 3,5-dichloro-4-(R¹R²N)anilines, and finally acylate these anilines to the anilides of this invention (as by Method D).

For example, 3,5-dichloro-4-(dimethylamino)nitrobenzene was made as described by Lemaire and Lucas, J. American Chemical Soc., 73, 5198 (1951) and then reduced to 3,5-dichloro-4-(dimethylamino)aniline as described by Drake et al., J. American Chemical Soc., 68, 1602 (1946). When 3-chloro-4-(dimethylamino)nitrobenzene is chlorinated with an excess of chlorine, demethylation occurs and 3,5-dichloro-4-(methylamino)nitrobenzene results.

Tables V and VI give pertinent data on typical 3,5-dichloro-4-(R¹R²N)substituted-anilides.

TABLE V

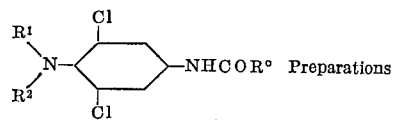

$R^1R^2N$—[ring with two Cl]—NHCOR° Preparations

| Example | R¹ | R² | R° | M.P. (°C.) | Recrystallization Solvent | Yield (percent) |
|---|---|---|---|---|---|---|
| 17 | CH₃ | H | C₃H₇(CH₃)CH— | 97-99 | Hexane | 21 |
| 18 | CH₃ | CH₃ | CH₃CH₂— | 135-137 | Methanol | 31 |
| 19 | CH₃ | CH₃ | CH₂=C(CH₃)— | 128-130 | Benzene-Hexane | 45 |
| 20 | CH₃ | CH₃ | C₃H₇(CH₃)CH— | 87-88.5 | Hexane | 47 |

TABLE VI

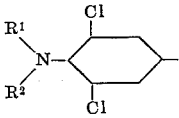

Analysis of [structure] Preparations

| Example | Empirical Formula | Analysis (Percent) | | |
|---|---|---|---|---|
| | | Element | Theory | Found |
| 17 | C₁₃H₁₈Cl₂N₂O | Cl | 24.5 | 24.2 |
| | | N | 9.7 | 9.7 |
| 18 | C₁₁H₁₄Cl₂N₂O | C | 50.6 | 50.7 |
| | | H | 5.4 | 5.5 |
| | | Cl | 27.2 | 27.2 |
| 19 | C₁₂H₁₄Cl₂N₂O | Cl | 26.0 | 26.3 |
| | | N | 10.3 | 10.1 |
| 20 | C₁₄H₂₀Cl₂N₂O | Cl | 23.46 | 23.09 |
| | | N | 9.27 | 9.30 |

The amino grouping in these

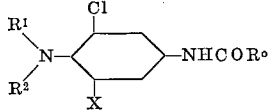

Compounds may be neutralized with an acid (HA), usually one equivalent is used, to give salts of the herbicidal anilides. The following reaction depicts these preparations:

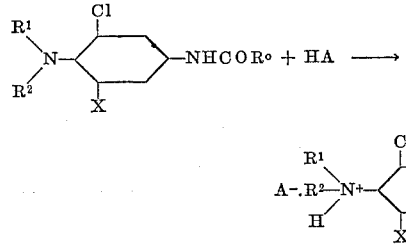

Acids which may be used to prepare these acid-addition salts include hydrobromic, hydrochloric, nitric, sulfuric, fluoboric, acetic, oxalic and maleic. Table VII gives typical salts of these anilides:

TABLE VII

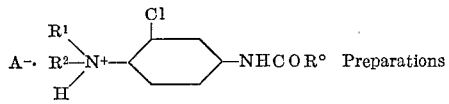

A⁻· R²—N⁺— [ring structure with Cl] —NHCOR° Preparations

| Ex. | R¹ | R² | R° | A— | M.P. (°C.) | Yield (Percent) | Analysis (Percent) | | |
|---|---|---|---|---|---|---|---|---|---|
| | | | | | | | Element | Theory | Found |
| 21 | CH₃ | CH₃ | CH₃CH₂— | Cl— | 187 (decomp.) | 35 | Cl | 27.00 | 27.03 |
| | | | | | | | N | 10.63 | 10.66 |
| 22 | CH₃ | CH₃ | C₃H₇(CH₃)CH— | Cl— | Oil | 85 | Cl | 23.28 | 23.30 |
| | | | | | | | N | 9.18 | 9.20 |
| 23 | iso-C₃H₇ | H | CH₂=(CH₃)— | HOOCCOO— | 120–123 | 56 | Cl | 10.3 | 10.77 |
| | | | | | | | N | 8.2 | 8.5 |

The amino-substituted anilides of this invention either alone or in admixture exhibit excellent post-emergence herbicidal activity on a variety of monocotyledonous and dicotyledonous weeds. For use as herbicides, the compounds of this invention may be formulated in several ways, such as wettable powders, emulsion concentrates, dusts or granular powders, and applied to the plants to be treated as desired, as in an air stream or in an aqueous spray, or by means of a granular applicator.

Compositions are prepared from the compounds of this invention by taking them up in an agronomically acceptable carrier, adding surfactants or other additives, if desired, and admixing to give uniformly formulated mixtures. By "agronomically acceptable carrier" is meant any substance which can be used to dissolve, dispense or diffuse the chemical to be used therein without impairing the effectiveness of the toxic agent and which does no permanent damage to such environment as soil, equipment and agronomic crops.

Emulsion concentrate formulations may be made by dissolving the amino-substituted anilides of this invention in an agronomically acceptable organic solvent and adding a solvent-soluble emulsifying agent. Suitable solvents for these anilides are found in the hydrocarbon, chlorinated hydrocarbon, ketone, ester, alcohol and amide classes of organic solvents, such as xylene, naphthas, ethylene dichloride, cyclohexanone, methyl ethyl ketone, isophorone, methyl hexanoate, or dimethylformamide, the preferred solvents being ketones or ketone-hydrocarbon mixtures. The emulsifying agents may be anionic, cationic or non-ionic in character. Anionic surfactants include alcohol sulfates or sulfonates, alkylarene sulfonates or sulfosuccinates, such as calcium dodecylbenzenesulfonate or sodium dioctyl sulfosuccinate. Cationic surfactants include fatty acid alkyl amine salts and fatty acid alkyl quaternaries, such as laurylamine hydrochloride or lauryldimethylbenzylammonium chloride. Non-ionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octylphenol having from about 7 to 100 groups. The concentration of the active ingredients may vary from 10 to 80%, but is preferably 25 to 50%, and the concentration of the emulsifying agents is usually 0.5 to 10% by weight, with the remainder of the formulation being the carrier.

The salts of the amino-substituted anilides may be conveniently applied as an aqueous solution, since many of the salts have sufficient solubility in water to provide a concentration of the active ingredient which is herbicidally active.

Wettable powders are made by incorporating the anilides in a finely-divided solid carrier and a surfactant or blend of surfactants. Solid carriers suitable for this use are found in the classes of naturally-occurring clays, silicates, silicas, carbonates, limes and organic materials. Typical of these are kaolin, fuller's earth, talc, diatomaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin such as diisobutylene, sodium lignin sulfonate and sodium formaldehyde-naphthalene sulfonates.

Typical wettable powders may contain, for example, 10 to 80% of the herbicidal anilides, and it is usually desirable to add from 1 to 10% by weight of the surfactant; the remainder of the formulation being, of course, the carrier.

Dust concentrates are made by compounding the anilides of this invention with inert carriers normally employed for the manufacture of pesticidal dusts for agricultural use, such as talcs, finely particled clays, pyrophyllite, diatomaceous earth, magnesium carbonate, sulfur, or botanical flours such as soybean, wood, wheat, cottonseed, and walnut shell. Dust concentrates containing from 20 to 80% of the toxicant are commonly prepared, but as used, the dusts preferably contain 1 to 20% of the active ingredient. Dust concentrates may be conveniently prepared by diluting a wettable powder formulation with the finely particled solid carriers customarily used in pesticidal dusts.

Granular formulations are made by incorporating the anilides of this invention into granular or pelletized forms of agronomically acceptable carriers, such as granular clays, vermiculite, charcoal, ground corn cobs, or bran in a range of sizes from 8 to 60 mesh (U.S. Standard Sieve Series sizes). Such granular formulations may be made to contain the anilide in from 1 to 50% by weight.

One convenient method for preparing a solid formulation is to impregnate the anilide toxicant onto the solid carrier by means of a volatile solvent, such as acetone. In this manner, adjuvants, such as fertilizers, activators, synergists, adhesives and various surfactants may also be incorporated. Furthermore, pesticides including insecticides and fungicides may be used in conjunction with or admixed with the herbicidal agents of this invention.

The anilides of this invention were evaluated in a standard herbicide screening procedure. This method involves planting seeds of representative crops and weeds in soil, allowing the seeds to germinate and when the seedlings are about two weeks old, applying thereto the test compound. The phytotoxic responses and state of growth of the test plants are measured about two weeks later. The agents are applied at desired rates in pounds per acre, usually in the range of 1 to 20 pounds, and at a standard carrier rate, if as a spray usually about 50 gallons per acre, although higher and lower carrier rates may be used. However, the major factor in determining herbicidal utility is the rate of application.

Monocotyledonous plants in these studies include barnyard grass (*Echinochloa crusgalli*), crab grass (*Digitaria sanguinalis*), foxtail (*Setaria glauca*), millet (*Setaria italica*), rice (*Oryza sativa*), ryegrass (*Lolium multiflorum*), Sudan grass (*Sorghum sudanensis*), wheat (*Triticum vulgare*) and wildoat (*Avena fatua*).

Dicotyledonous plants include chickweed (*Stellaria media*), clover (*Trifolium repens* var. *ladino*), curly dock (*Rumex crispus*), flax (*Linum usitatissium*), Indian mallow (*Abutilon theophrasti*), lamb's-quarter (*Chenopodium album*), mustard (*Brassica kaber*), pigweed (*Amaranthus retroflexus*), ragweed (*Ambrosia artemisiifolia*), sorrel (*Rumex acetosa*), soybean (*Soja max*), tomato (*Lycopersicum esculentum*) and wild carrot (*Daucus carota*).

Results are given in Table VIII for typical monocotyledonous weeds and in Table IX for typical dicotyledonous weeds:

TABLE VIII
[Percent phytotoxicity at rate of 3 lbs./acre]

| Compound of Example | Crabgrass | Foxtail | Millet | Wildoat |
|---|---|---|---|---|
| 1 | 50 | 100 | 70 | 80 |
| 2 |  | 60 | 100 |  |
| 3 | 70 | 90 | 100 |  |
| 4 |  |  |  | 90 |
| 5 | 80 | 100 | 100 | 90 |
| 6 | 80 | 90 | 100 | 90 |
| 7 |  | 80 | 100 |  |
| 8 |  | 90 | 100 |  |
| 9 | 80 |  | 100 | 100 |
| 10 | 70 | 70 |  | 60 |
| 12 | 70 | 100 | 80 |  |
| 13 | 99 | 100 | 100 | 80 |
| 14 | 90 | 100 | 100 | 60 |
| 18 | 60 | 100 | 100 | 90 |
| 19 | 90 | 100 |  | 95 |
| 21 | 95 | 100 | 100 |  |
| 22 | 80 | 100 | 100 |  |

TABLE IX
[Percent phytotoxicity at rate of 3 lbs./acre]

| Compound of Example | Curly Dock | Lambs-quarters | Indian Mallow | Mustard | Pigweed | Sorrel |
|---|---|---|---|---|---|---|
| 1 | 90 | 100 | 100 | 100 | 100 |  |
| 2 | 100 | 100 | 100 | 100 | 100 |  |
| 3 | 100 | 100 | 100 | 100 | 100 |  |
| 4 | 90 |  | 100 | 90 | 70 |  |
| 5 | 100 |  | 100 | 90 | 100 |  |
| 6 | 100 |  | 100 | 100 | 100 |  |
| 7 | 100 | 100 | 100 | 100 | 100 |  |
| 8 | 100 |  | 100 | 100 | 100 |  |
| 9 | 100 |  | 100 | 100 | 100 |  |
| 10 | 70 | 100 | 100 | 100 | 90 | 100 |
| 11 | 70 |  |  | 80 | 80 | 80 |
| 12 | 100 |  | 100 | 100 | 100 | 100 |
| 13 | 100 | 100 | 100 |  | 100 |  |
| 14 | 100 |  | 100 | 100 | 100 | 100 |
| 15 | 100 | 100 | 40 | 90 | 90 | 90 |
| 16 | 100 |  | 60 | 100 | 90 | 100 |
| 17 | 100 | 100 | 20 | 100 | 90 |  |
| 18 | 100 | 100 | 100 | 100 | 100 | 100 |
| 19 | 80 | 100 | 30 | 100 | 90 | 42 |
| 20 | 90 |  |  |  | 100 | 70 | 70 |
| 21 | 100 | 100 | 100 |  | 00 |  |
| 22 | 100 | 100 | 100 |  | 100 |  |

The compounds of this invention are excellent post-emergence herbicides on both monocotyledonous and dicotyledonous type weeds.

A standard herbicide test was used for comparing amino-substituted anilides. In this test, pots were planted with two representative monocotyledonous plants (*Avena fatua* and *Setaria italica*) and two representative dicotyledonous plants (*Abutilon theophrasti* and *Rumex crispus*). A post-emergence test was run in which the plants were allowed to germinate and two weeks thereafter the agents were applied. In both procedures, the test compounds were applied at a rate of 3 lbs./acre. Data were recorded as an average per cent kill. Taxle X gives the results and it is demonstrated that practical herbicidal activity is vested in only specific amino-substituted anilide structures.

TABLE X
[Percent phytotoxicity of various amino-substituted anilide structures]

| Compound | Post-emergence at 3 lb./acre | |
|---|---|---|
| | Monocots | Dicots |
| 3-Cl-4-(CH₃)₂NC₆H₃NHCOCH₃ | 0 | 40 |
| 3-Cl-4-(CH₃)₂NC₆H₃NHCOCH₂CH₃ | 90 | 95 |
| 3,5-Cl₂-4-NH₂C₆H₂NHCOCH₂CH₃ | 5 | 35 |
| 3,5-Cl₂-4-(CH₃)₂NC₆H₂NHCOCH₂CH₃ | 95 | 100 |
| 3-Cl-4-Cyclohexyl-NHC₆H₃NHCOCH₂CH₃ | 0 | 45 |
| 3-Cl-4-t-C₄H₉NHC₆H₃NHCOCH₂CH₃ | 65 | 85 |

Representative compounds were evaluated as aquatic herbicides. For this test, duckweed (*Lemna minor*) is cultured in a 25 gallon polyethylene-lined vat containing water and a small amount of soil. The pH is maintained at 6.0. Aqueous solutions or suspensions of the test compound are made to contain 1, 5 and 10 p.p.m. To 200 ml. portions of these concentrations of the test compound is added a pinch of the duckweed. Untreated controls and a standard aquatic herbicide (an alkyldimethylbenzylammonium chloride, known commercially as Hyamine 3500) are included in the test. The tests are maintained in a greenhouse under standard conditions of temperature and humidity for two weeks and then are visually rated for toxicity and growth. The following results were obtained (Table XI):

TABLE XI
[Percent phytotoxicity to duckweed]

| Compound of Example | Concentration (p.p.m.) | | |
|---|---|---|---|
| | 1 | 5 | 10 |
| 3 | 90 | 100 | 100 |
| 5 | 100 | 100 | 100 |
| 8 | 80 | 100 | 100 |
| 9 | 70 | 100 | 100 |
| 13 | 20 | 50 | 90 |
| 17 | 0 | 100 | 100 |
| 18 | 20 | 90 | 90 |
| 22 | 20 | 50 | 90 |
| 23 | 50 | 70 | 90 |

Thus, representative compounds of this invention have demonstrated execellent ability as aquatic herbicides. In the same test, such herbicides as 3',4'-dichloropropionanilide, 3',4'-dichloro - 2,2 - dimethylpropionanilide and 3',4'-dichloroisobutyranilide have been ineffective.

A field test was conducted in which 3'-chloro-4'-(dimethylamino)propionanilide (Example 1), 3'-chloro-4'-dimethylamino-2-methylvaleranilide (Example 13) and 3',5'-dichloro - 4' - (dimethylamino)propionanilide (Example 18) were compared with respect to crop tolerance and weed control. In this test, 27 selected crops were planted in rows in an area known to give a heavy population of both monocotyledonous and dicotyledonous weeds. Sixteen days after planting, the chemicals were applied as aqueous sprays to the planted area as a blanket treatment at dosages of 1 and 4 pounds per acre in a carrier volume of 50 gallons per acre. One week later, the weed control and crop tolerances were evaluated. A crop was judged to be tolerant if less than 30% injury was produced.

It was found that excellent control of both grassy and broad-leaved type weeds was obtained, particularly at the higher dosage. Crops found to be tolerant at weed-controlling rates of all three compounds include barley (*Hordeum vulgare*), carrots (*Daucus carota* var. *sativa*), field corn (*Zea maize* var. *indentata*), sweet corn (*Zea maize* var. *saccharata*), cotton (*Gossypium herbaceum*), lima beans (*Phaseolue limensis*), onions (*Allium cepa*) and sorghum (*Sorghum vulgare*). In addition, flax (*Linum usitatissimum*) was found to be tolerant to 3'-chloro-4'-dimethylamino - 2 - methylvaleranilide. This compound (Example 13) was slightly more active herbicidally than the other two and, in addition, gave preemergence control of the particularly noxious weed common purslane (*Portulaca oleracea*). Optimum rates which gave practical control of weeds accompanied by acceptable crop tolerances were 2 to 3 pounds per acre.

In a similar type test involving cereal crops with the chemicals of Examples 1, 13 and 18 applied at 2 and 4 pounds of the active ingredient per acre, it was found that barley (*Hordeum vulgare*), oats (*Avena sativa*), rye (*Secale cereale*) and wheat (*Triticum vulgare*) were tolerant at weed-controlling rates of application.

In another test similar to the above in which 3'-chloro-4'-(propylamino)methacrylanilide (Example 5) was evaluated, peas (*Pisum arvense*), rice (*Oryza sativa*) and soybeans (*Soja max*) were found to be tolerant at a dosage of 3 pounds per acre and excellent control of weeds was obtained.

By this invention, there is provided a new type of anilide-herbicide which has special virtue because of nuclear alkyl-amino substituents. This constitutes a small and selective group of anilides which heretofore have been unknown and for which the herbicidal activity exhibited is unpredictable.

We claim:
1. A compound of the formula

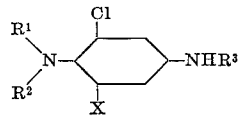

wherein
  $R^1$ and $R^2$ are selected from the group consisting of hydrogen and lower alkyl with the proviso that at least one of these be alkyl,
  $R^3$ is an acyl group selected from the class consisting of propionyl, isobutyl, α-methylvaleryl and methacrylyl, and
  X is a member of the group consisting of hydrogen and chlorine, and acid-addition salts thereof selected from the group consisting of hydrohalides, sulfates, nitrates, phosphates, fluoborates, acetates, acid oxalates and acid maleates.
2. The compound of claim 1 in which
  $R^1$ and $R^2$ are lower alkyl,
  $R^3$ is α-methylvaleryl, and
  X is hydrogen and said acid-addition salts thereof.
3. 3'-chloro-4'-(dimethylamino)propionanilide.
4. 3',5'-dichloro-4'-(dimethylamino)propionanilide.
5. 3'-chloro-4'-dimethylamino-2-methylvaleranilide.
6. 3'-chloro-4'-(propylamino)methacrylanilide.
7. 3'-chloro-4'-(isopropylamino)methacrylanilide.

References Cited by the Examiner
UNITED STATES PATENTS

| 2,226,672 | 12/1940 | Smith | 260—562 |
| 2,357,912 | 9/1944 | Seymour et al. | 260—562 |
| 2,368,195 | 1/1945 | Britton et al. | 260—562 |
| 2,552,242 | 5/1951 | Weissberger et al. | 260—562 |
| 2,688,637 | 9/1954 | Coleman et al. | 260—562 |
| 2,771,466 | 11/1956 | Towne et al. | 260—562 |
| 3,062,636 | 11/1962 | Regenstein | 71—2.3 |
| 3,072,471 | 1/1963 | Smith et al. | 71—2.3 |

FOREIGN PATENTS

| 92,725 | 2/1962 | Denmark. |
| 1,005,784 | 9/1957 | Germany. |
| 606,529 | 7/1960 | Italy. |

OTHER REFERENCES

Ayling et al.: Chemical Abstracts, vol. 37, cols. 1398–99 (1943) [abstract of Jour. Chem. Soc. (London), 1942, pages 755–8].

Sokolova et al.: Chemical Abstracts, vol. 52, column 17166 (1958).

WALTER A. MODANCE, *Primary Examiner.*

NATALIE TROUSOF, *Assistant Examiner.*